United States Patent
Spiesshofer et al.

(10) Patent No.: US 10,058,964 B2
(45) Date of Patent: Aug. 28, 2018

(54) TRANSPORT DEVICE FOR TRANSPORTING A WORK PIECE ALONG CONSECUTIVE PROCESSING STATIONS OF A PRODUCTION INSTALLATION, A PRODUCTION INSTALLATION, A MULTISTAGE FORMING PRESS, AND A METHOD FOR MANUFACTURING PRODUCTS FROM WORK PIECES BY MEANS OF A PRODUCTION INSTALLATION

(71) Applicant: SCHULER PRESSEN GMBH, Goeppingen (DE)

(72) Inventors: Thomas Spiesshofer, Bermatingen (DE); Ulrich Amann, Baindt (DE); Ralf Heudorfer, Wolpertswende (DE)

(73) Assignee: SCHULER PRESSEN GMBH, Goeppingen (DE)

( * ) Notice: Subject to any disclaimer, the term of this patent is extended or adjusted under 35 U.S.C. 154(b) by 0 days.

(21) Appl. No.: 15/375,184

(22) Filed: Dec. 12, 2016

(65) Prior Publication Data
US 2017/0182611 A1   Jun. 29, 2017

(30) Foreign Application Priority Data
Dec. 15, 2015   (DE) .......................... 10 2015 121 884

(51) Int. Cl.
*B23Q 7/14*   (2006.01)
*B21D 43/05*   (2006.01)
(Continued)

(52) U.S. Cl.
CPC .......... *B23Q 7/1426* (2013.01); *B21D 43/055* (2013.01); *B23Q 41/02* (2013.01); *B65G 47/90* (2013.01); *B65G 2201/02* (2013.01)

(58) Field of Classification Search
CPC .... B21D 43/055; B23Q 7/1426; B23Q 41/02; B65G 2201/02; B65G 47/90; B65G 47/901; B65G 2203/0283
See application file for complete search history.

(56) References Cited

U.S. PATENT DOCUMENTS 4,805,759 A * 2/1989 Rochet .................. B65G 47/50
                                                    15/301
6,076,875 A * 6/2000 Neff ......................... B25J 9/023
                                                    294/119.1

(Continued)

FOREIGN PATENT DOCUMENTS

DE          40 22 560 C2    7/1995
DE   10 2004 044 767 A1    4/2006
(Continued)

*Primary Examiner* — Mark A Deuble
(74) *Attorney, Agent, or Firm* — Norman B. Thot

(57) ABSTRACT

A transport device for transporting a work piece along consecutively arranged processing stations of a production installation or a forming press. The transport device includes a first handling installation which transports the work piece which is assigned to the transport device and/or to a transport device which comprises a first transport rail which is longitudinally vertically and/or transversely displaceable. The first handling installation is arranged at the first transport rail or at one of the processing stations and/or at the production installation or at the forming press. A drive is assigned to the transport device. The drive drives the first transport rail and/or the at least one handling installation. The first handling installation is one-dimensionally or multi-dimensionally displaceable so that a multi-axis transport of the work piece is flexibly realized by the first handling installation alone or through an interaction of the first handling installation with the transport rail.

11 Claims, 15 Drawing Sheets

(51) Int. Cl.
*B23Q 41/02* (2006.01)
*B65G 47/90* (2006.01)

(56) References Cited

U.S. PATENT DOCUMENTS

| | | | |
|---|---|---|---|
| 6,876,107 B2 * | 4/2005 | Jacobs | ............... B60L 15/38 |
| | | | 310/12.19 |
| 6,923,119 B1 * | 8/2005 | Frank | ............... B41F 21/08 |
| | | | 101/232 |
| 2013/0152516 A1 * | 6/2013 | Sammons | ............... B65B 9/087 |
| | | | 53/562 |
| 2014/0227065 A1 | 8/2014 | Muller et al. | |

FOREIGN PATENT DOCUMENTS

| | | |
|---|---|---|
| DE | 10 2005 034 079 A1 | 1/2007 |
| DE | 10 2009 003 492 A1 | 8/2009 |
| DE | 10 2011 118 216 B4 | 5/2013 |
| DE | 20 2013 102 852 U1 | 10/2014 |

* cited by examiner

TRANSPORT DEVICE FOR TRANSPORTING A WORK PIECE ALONG CONSECUTIVE PROCESSING STATIONS OF A PRODUCTION INSTALLATION, A PRODUCTION INSTALLATION, A MULTISTAGE FORMING PRESS, AND A METHOD FOR MANUFACTURING PRODUCTS FROM WORK PIECES BY MEANS OF A PRODUCTION INSTALLATION

CROSS REFERENCE TO PRIOR APPLICATIONS

Priority is claimed to German Patent Application No. DE 10 2015 121 884.4, filed Dec. 15, 2015. The entire disclosure of said application is incorporated by reference herein.

FIELD

The present invention relates to a transport device for transport of a work piece along consecutive processing stations of a production installation, wherein at least one handling installation for transporting a work piece is assigned to the transport device and/or the transport device comprises a transport rail, which is longitudinally and/or vertically and/or transversely displaceable, wherein the handling installation is disposed at the transport rail or at one of the processing stations and/or at the production installation, and a drive is assigned to the transport device, wherein the drive drives the transport rail and/or the handling installation. The present invention further relates to a production installation, a forming press with several processing stations and a method for manufacturing products from work pieces by means of a production installation with at least two station rows.

BACKGROUND

The number of realizable processing stations is limited in a production installation, for example, a press. The product cannot be manufactured from the work piece in a single pass within the production installation if a great number of processing stations are required for manufacturing a work piece. It is then necessary to perform two consecutive passes in a production installation and to exchange the processing stations and/or tools after the first pass of the work pieces and/or to provide two production facilities having the various suitable stations in order to manufacture the product.

A processing station of a press features one respective tool. Six such tools are typically disposed in a row. The pressing force of the press is, however, often significantly higher than the pressing force required for using the tools. The surface available under the press slide is to some extent also not used by the tools.

A transport device for transporting work pieces along the processing stations of a transfer press usually consists of two gripper rails extending in the transport direction of the work pieces. In addition to the longitudinal movement and the lifting movement, the gripper rails perform an additional transverse movement, wherein gripper elements are provided at the gripper rails for gripping and/or advancing the work pieces from one processing station to the next. The possibilities of movement of the gripper rails and gripper elements are generally cleverly distributed. The gripper elements take care of the movement along the gripper rail, for example, so that the gripper rail no longer needs to implement this movement itself.

Most of the time, the transport device is disposed in the production installation laterally outside of the processing station. In order for the gripper rails and the gripper elements to not interfere with the processing operation of the press within the tool area, the gripper rails must be moved back out of the tool area, for example, laterally.

Conventional tri-axial transfer devices comprise, for example, two grippers disposed opposite each other at respectively external gripper rails. The grippers are grippingly disposed on two sides opposite each other with an offset of, for example, a specific degree value (in particular 180°). The two gripper rails with the grippers can perform synchronous and independent, partly symmetrical movements, which can, however, only be performed in the same direction of movement along the lifting, closing and/or feed axis (transport axis).

A conventional tri-axial transfer system with two opposite grippers and external gripper rails is described, for example, in DE 10 2011 118 216 B4 for a transport along consecutive processing stations in a throughput direction.

DE 40 22 560 C2 describes a multi-station processing apparatus with a transfer installation for successively transporting the work pieces from one processing station to the next in which the processing stations are disposed in a staggered manner on two opposite lines. The gripper arms here transport the work pieces in a regular zigzag line.

DE 10 2004 044 767 A1 describes an assembly for transporting work pieces in a manufacturing line, wherein work pieces are transported on pallets by a pallet loading portal along a line in a main conveying direction, and the work pieces are discharged perpendicularly to this main conveying direction so that the work pieces reach the processing stations. The processed work pieces are then transported by a roller conveyor along a line in the opposite direction to the main conveying direction, wherein the roller conveyor can allow for a flexible reversible material flow.

DE 10 2005 034 079 A1 describes a modular manufacturing system with an agent-based assignment of orders. A manufacturing plant with a handling installation and several modular manufacturing stations is described in DE 10 2009 003 492 A1.

DE 20 2013 102 852 U1 describes a processing installation with a conveying installation by which work pieces are transported by a work piece carrier using their own weight and gravity.

SUMMARY

An aspect of the present invention is to improve on the prior art.

In an embodiment, the present invention provides a transport device for transporting a work piece along processing stations which are consecutively arranged of a production installation or a forming press. The transport device includes a first handling installation which is configured to transport the work piece. The first handling installation is assigned to the transport device and/or to a transport device which comprises a first transport rail which is configured to be at least one of longitudinally displaceable, vertically displaceable, and transversely displaceable. The first handling installation is arranged at the first transport rail or at one of the processing stations and/or at the production installation or at the forming press. A drive is assigned to the transport device. The drive is configured to drive the first transport rail and/or the at least one handling installation. The first handling installation is configured to be one-dimensionally or multi-dimensionally displaceable so that a multi-axis transport of the work piece is flexibly realized by the first handling installation alone or through an interaction of the first handling installation with the transport rail.

BRIEF DESCRIPTION OF THE DRAWINGS

The present invention is described in greater detail below on the basis of embodiments and of the drawings in which.

DETAILED DESCRIPTION

Figure 1:
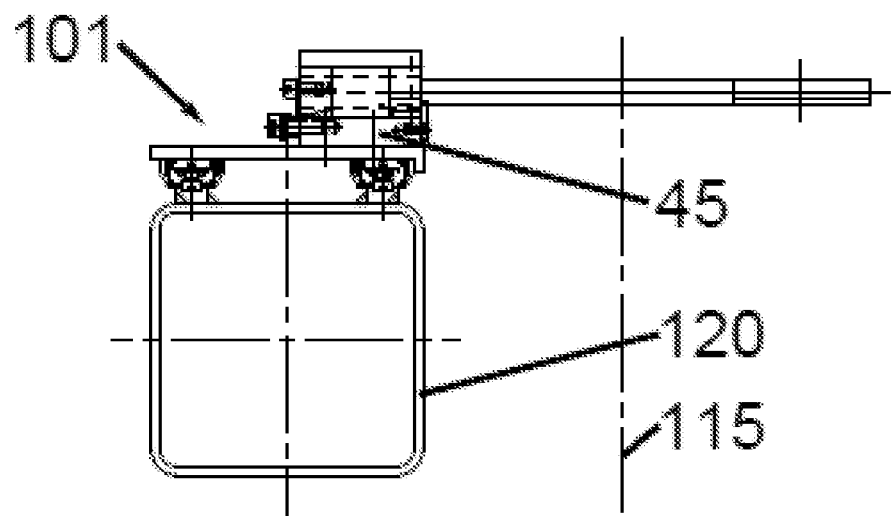
FIG. 1 shows an alternative of a schematic sectional representation of a transport gripper without a drive, but with a device support holder, and a transport rail.
Figure 2:
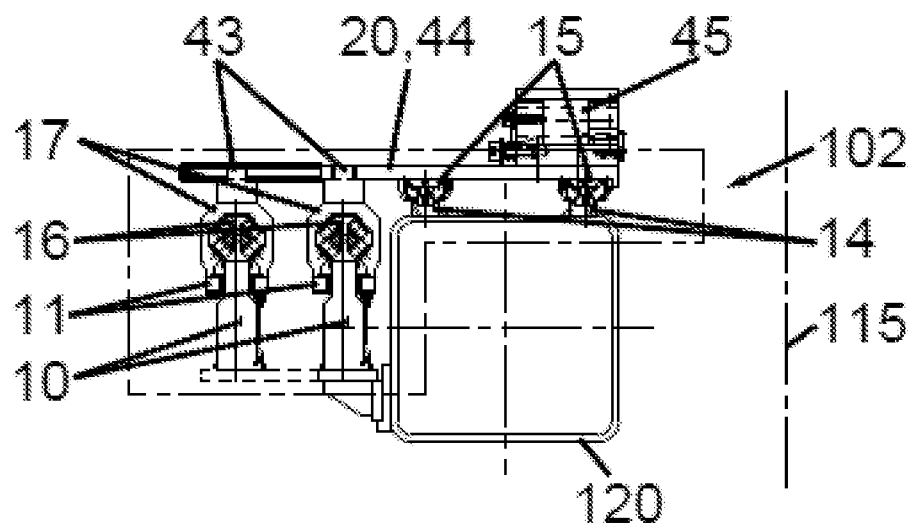
FIG. 2. shows an alternative of a schematic sectional representation a transport gripper with drives, guides, a device support holder, and a transport rail.
Figure 3:
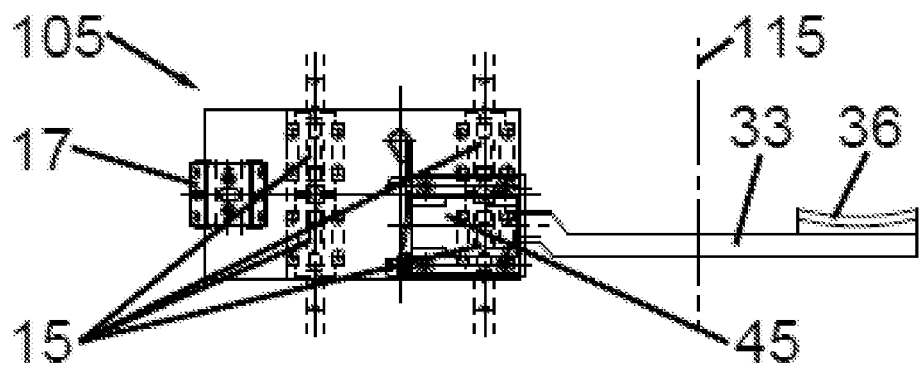
FIG. 3 shows an alternative of a top view of a transport gripper with a drive, guides, a gripper arm, a gripper jaw, and a device support holder.
Figure 4:
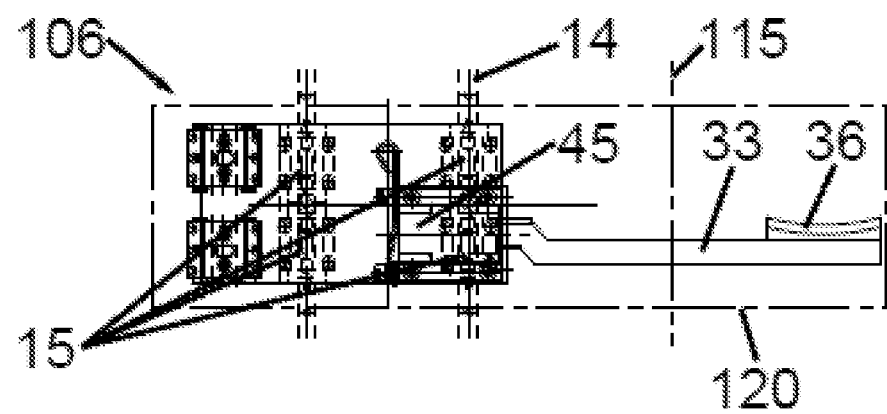
FIG. 4 shows an alternative of a top view of a transport gripper with drives, guides, a device support holder, and a transport rail.
Figure 5:
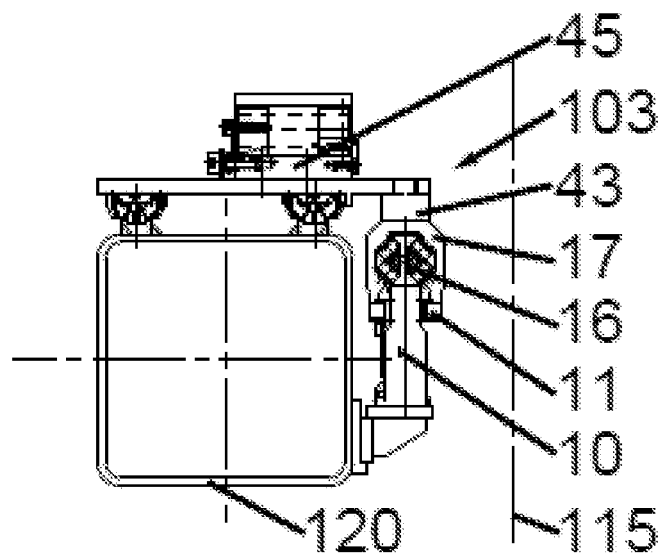
FIG. 5 shows an alternative of a schematic sectional representation of a transport gripper with drives, a device support holder, and a transport rail.
Figure 6:
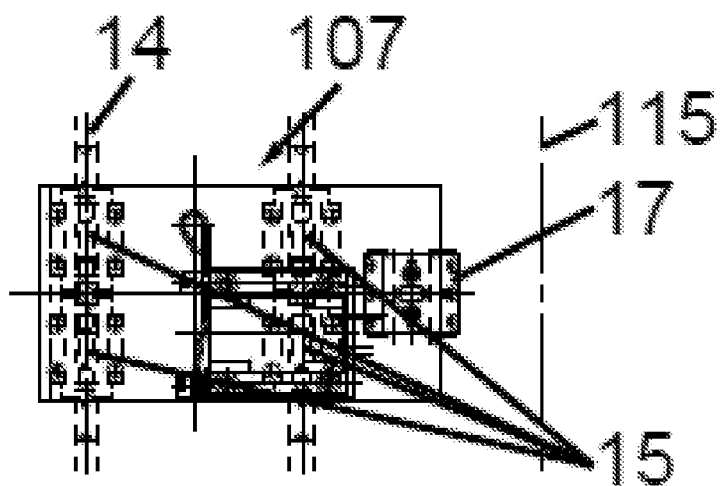
FIG. 6 shows an alternative of a top view of a transport gripper with a drive and guides.
Figure 7:
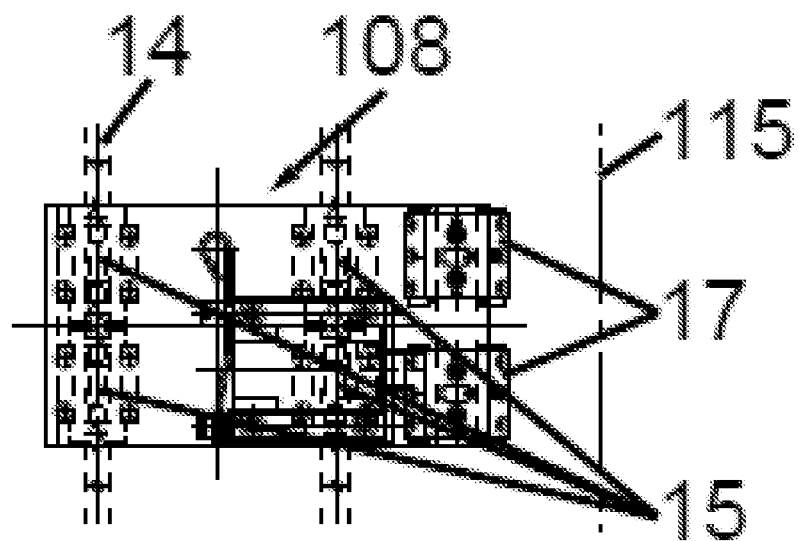
FIG. 7 shows an alternative of a top view of a transport gripper with a drive and guides.
Figure 8:
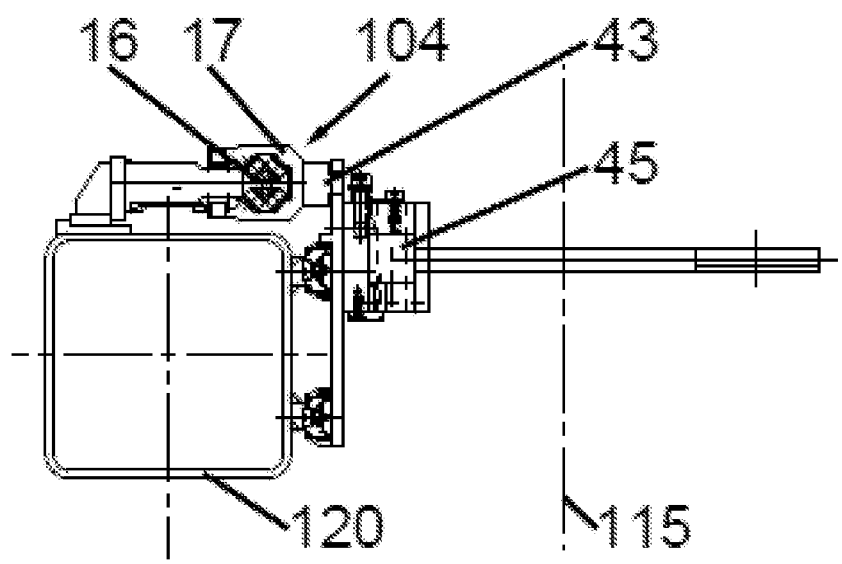
FIG. 8 shows an alternative of a schematic sectional representation of a transport gripper with drives, a device support holder, and a transport rail.
Figure 9:
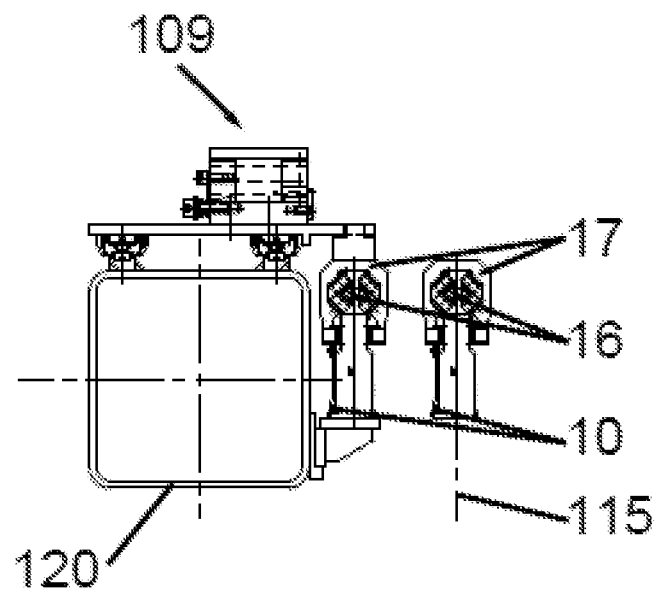
FIG. 9 shows an alternative of a sectional representation of a transport gripper with drives, and a transport rail.
Figure 10:
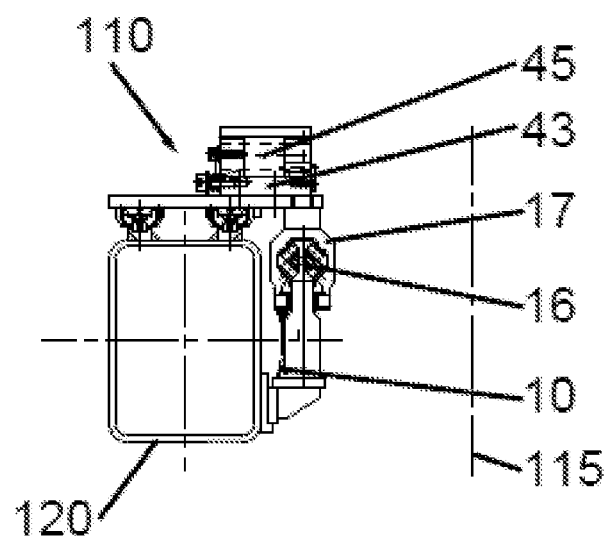
FIG. 10 shows an alternative of a schematic representation of a transport gripper with drives, a device support holder, and a transport rail.
Figure 11:
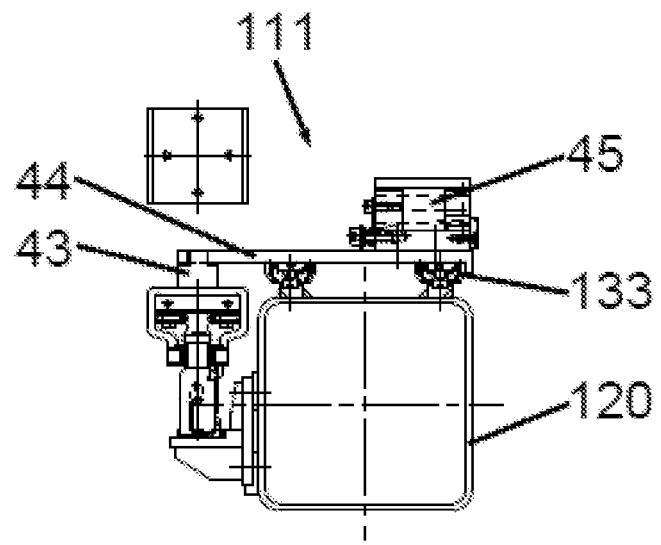
FIG. 11 shows an alternative of a schematic representation of a transport gripper without a drive, but with a device support holder, and a guide.
Figure 12:
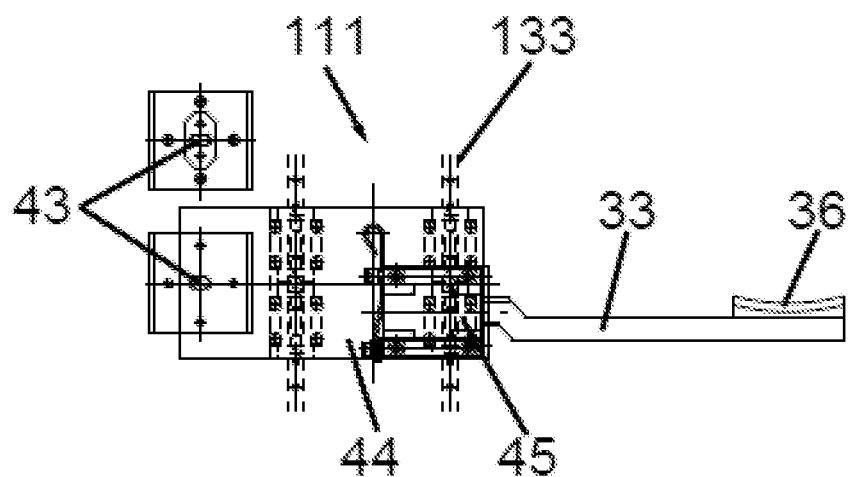
FIG. 12 shows an alternative of a top view of a transport gripper with a gripper arm, a gripper jaw, a device support holder, and a transport rail.
Figure 13:
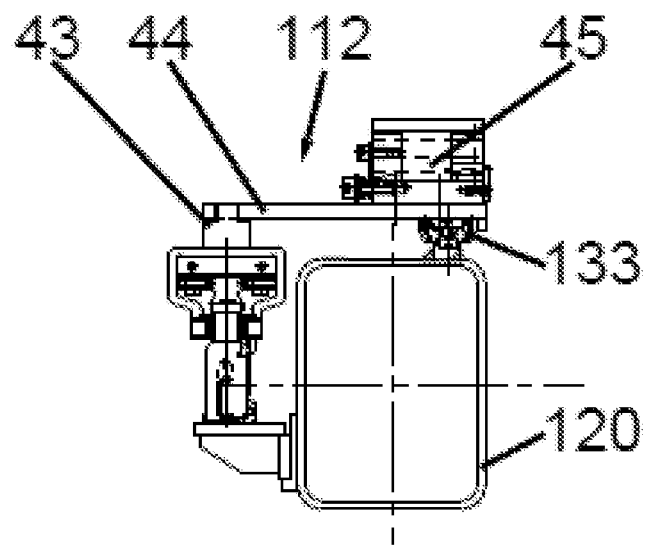
FIG. 13 shows an alternative of a schematic sectional representation of a transport gripper with a device support holder and a transport rail.

The present invention provides a transport device for transporting a work piece along consecutive processing stations of a production installation or forming press, wherein at least one handling installation for transporting a work piece is assigned to the transport device and/or the transport device comprises a transport rail, which is longitudinally and/or vertically and/or transversely displaceable, wherein the handling installation is disposed at the transport rail or at one of the processing stations and/or at the production installation or forming press, and a drive is assigned to the transport device, wherein the drive drives the transport rail and/or the handling installation, and the handling installation is one-dimensionally or multi-dimensionally displaceable, so that a multi-axis transport of the work piece is flexibly implemented by the handling installation alone or through an interaction of the handling installation with the transport rail.

A redundancy of the directions of movement of the transport rail and/or the handling installation thus allows for a high level of flexibility. In a case in which a transport rail is provided and currently stands still, the handling installation can take over the missing directions of movement, for example, a lifting movement. The handling installation can thus take over the entire transport of the work piece. In this case, instead of having to drive the carrier rails, which have a high mass and thus a substantially higher mass inertia compared to the smaller handling facilities, only the flexible handling installation needs to be driven. This leads to a reduction of the weight, an increase of the cycle rate, because the dead weights to be moved are reduced, and at the same time also to a reduction of the energy expenditure.

The transport rail can also be uniaxial or multi-axial and, depending on the design of the handling installation, replaces the missing directions of movement.

An extremely flexible uniaxial or multi-axial transport system is thus provided by a handling installation, the energy expenditure of the system being reduced due to the absence of carrier rails or due to carrier rails with a lesser number of axes and due to shorter transport paths. The required path of movement and/or the external measurements of the carrier device are also reduced.

An additional weight reduction is made possible by the fact that the distance between the one-dimensionally or multi-dimensionally movable handling installation and the work piece can be reduced. The carrier device can thus be smaller and thus have a lesser mass. The saved space makes also it possible to dispose more processing stations in a production installation.

One important idea of the present invention is based on the fact that multi-dimensionally displaceable handling installations allow for a flexible multi-axial transport of work pieces along a series of consecutive processing stations, so that the directions of movement of the transport rails can be replaced and/or complemented.

This allows for the implementation of a smaller configuration than in the prior art and of a more flexible transport in various directions.

The following terms must be explained:

A "transport device" is a device for transporting one and/or several work pieces along consecutive processing stations within a production installation. The work piece and/or the work pieces are transported, in particular, to a processing station, into the processing station, inside the processing station, out of the processing station, and to the next processing station. By transporting a work piece and/or several work pieces by the transport device, the degree of completion of the work piece is in particular increased. Several work pieces are in particular transported simultaneously and/or synchronously and/or asynchronously by the transport device.

A "work piece" is more specifically a largely solid object which is processed. A work piece is, for example, a metal sheet or a circuit board.

"Processing stations", which are also referred to as "production units" or "production stations", refers more specifically to the various stations and/or stages for processing a work piece in order to manufacture a product. The processing stations are in particular disposed one after another so that the degree of completion of the work piece increases respectively due to the passage of the work piece from one processing station to the next. The processing stations more specifically comprise different tools and/or manufacturing methods and/or forming methods.

The term "along" refers in particular to the fact that the work piece is transported from one processing station to the next processing station, wherein the work piece is more specifically transported toward a processing station, into it, held in this processing station (in particular during processing) and/or moved, moved out of this processing station, and transported to the next processing station. The transport along consecutive processing stations increases, in particular gradually, the respective degree of completion of the respective work piece. The term "along" does not, however, necessarily mean that the consecutive processing stations are disposed in a row and that the transport occurs along that row. It can also mean that a work piece is transported by a handling installation from one station row to another station row. The term "along" thus also in particular refers to the fact that the transport along consecutive processing stages is carried out independently of the geometrical arrangement of the processing stations.

A "production installation" (also referred to as "production system") is in particular an installation for manufacturing a product. More specifically, the production installation can be disposed in a press and/or machine or the production installation can be the press and/or the machine itself. A production installation serves to manufacture one and/or several products. Similar and/or different products can, for example, be manufactured in a production installation. A production installation more specifically comprises several processing stations. A production installation can in particular comprise any degree of automation for manufacturing any type of product, for example, pressed and formed parts, but also production parts, cast parts, injection molded parts, extruded parts, and the like.

The term "longitudinal" refers in particular to the direction along the longitudinal axis of the body. The term "longitudinal" shall in particular be understood as the direction along a transport rail.

The term "vertical" in particular means plumb-vertical relative to the earth's surface and/or oriented toward the earth's center. Vertical in particular refers to a direction that is orthogonal to the longitudinal axis of the body. "Vertical" in particular refers to the direction that is orthogonal (90°) to the longitudinal axis of the transport rail.

"Transversal" in particular refers to a plane that is perpendicular to the longitudinal axis of the body. The term "transversal" must in particular be understood as a plane that is perpendicular to the longitudinal axis of the transport rail.

A "transport rail" is in particular a rail for transporting a work piece along consecutive processing stations within a production installation. A transport rail can in particular be a single rail and/or a gripper rail. A transport rail can be disposed, more specifically alone and/or in pairs, at consecutive processing stations and/or station rows. One or several tracks, guides, rails, guide rails, stators and/or rotors (possibly also unwound stators and/or rotors) and/or one or several handling installations can be provided at a transport rail. A transport rail is displaceable, in particular, by a drive and/or is moved by a robot. In the case of single rails, it is also possible to use several individual robot stations to move parts of the rail. A carrier rail can also in particular be comprised of several coupleable parts, wherein the end pieces and the decoupleable central piece located, for example, therebetween, must be provided so that the mobility of a handling installation is not hindered in the area of the coupling areas.

A "handling installation" is in particular an individually controllable, one or multi-dimensionally displaceable, driven and/or brakable and fixable transport system, which is in particular designed with and/or without a guide. The handling installation is more specifically driven externally and/or comprises one or several drives. The one or multi-dimensionally displaceable handling installation can more specifically perform transport movements in any directions, including translational or rotatory movements. A handling installation in particular comprises a gripper element (grippers, pincers, holding devices and the like), wherein the handling installation approaches the work piece, on its own and/or in cooperation with the carrier rail, until the work piece is clamped and/or held, and, for example, lifts, rotates and transports the work piece onward. In this process, the sequence of movements of the handling installation is in particular variable and can take place as a movement or direction of movement that does not need to be defined. A repeated sequence of identical or similar movements can in particular be carried out successively and/or distributed across the movement process and/or the movement cycle. A handling installation in particular grips and/or embraces and/or holds on one side, two sides or multiple sides. A handling installation can in particular be designed so that it is fixed in a stationary manner or displaceable. A handling installation can be constructed in one piece or several pieces. Active or passive gripper elements, a vacuum device, magnet device and/or blowing device with or without a rotating device are in particular disposed at the handling installation. The handling installation can be moved on tracks, for example, guides, rails, air tracks, magnetic tracks and similar tracks provided to this end. The handling installation is in particular movable in a plane, which results, for example, from the guide track in a carrier rail, displaceable on the carrier rail, attached to the carrier rail and/or integrated into it. The movement axes of the handling installation are controllable, for example, independently from each other. A work piece can be transported, turned, rotated, tilted and/or freely moved by the handling installation. The components of a handling installation and their movement capabilities and movement directions can in particular be disposed and/or exchanged as needed in order to fulfill similar and/or identical functions for transporting a work piece. The handling installation can in particular be disposed at a transport rail and/or a processing station and/or a tool and/or a production installation.

A "drive" is in partiuclar a constructional unit which moves and/or displaces a carrier rail and/or a handling installation by energy transformation. A drive can in particular be implemented pneumatically, hydraulically, electrically, (electro-) magnetically, mechanically, for example, by linear units, cylinders, grippers, motors, rotatory modules, actuators, linear motors, belts, chains, gear trains generating (electro-) magnetic forces and/or by a coupleable rail system. A drive is in particular a direct drive and/or an indirect drive. A drive can in particular be a rotatory drive and/or a rotatory output. A drive can in particularcomprise a drive train, for example, discs, belts, wheels, transmissions, chains, shafts with gears, bevel gears, flexible shafts and/or articulated drives, cylinders, rods, angle levers and the like.

"Multi-axial" refers in particular to a transport that comprises more complex movements than a rotation and/or a movement around an axis. The multi-axial transport can in particular be carried out as a complex movement in the directions of several movement axes and/or directions of movement, wherein the sequence of the movements is variable.

In an embodiment of the present invention, the transport device can, for example, comprise additional transport rails, wherein at least two transport rails are displaceable independently from each other.

A flexible transport within a production installation can be implemented due to the fact that two transport rails are independently displaceable. Two transport rails can thus be disposed on opposite sides of consecutive processing stations. The handling installations can thus also implement a transport and/or transfer between the two transport rails and thus allow for a flexible sequence of the processing stations and/or a flexible feed direction of the work pieces.

For the first time, it is therefore now furthermore possible to implement different (for example, opposing) transfer directions within a single press. A transfer press can now be provided, for example, in which the work piece intake side is identical with the work piece outlet side. The handling installation or a gripper with the same functional capabilities as the handling installation can, for example, be disposed at the end of the first transport rail, the installation or gripper "moving" an exiting work piece onto the second transport rail, wherein the two transport rails have opposing directions of transfer. A greater number of production installations (for example, tools) can thus be accommodated in a single press. A particular advantage thereof is that the press is better utilized with regard to its pressing force and to the space under the press slide. A second press or a lengthy retooling can thus be dispensed with.

An open-loop control unit and/or a closed-loop control unit is or are assigned to the handling installation in order for a movement axis of the handling installation to be individually controllable and/or adjustable.

This allows for a flexible multi-dimensional movement of the handling installation and/or of the associated gripper element. The movement axes of a handling installation can thus be controlled individually and/or simultaneously and/or successively. The movements occurring in different directions can thus be implemented by drives coupled with the carrier rail or the carrier rail can be fixed or absent so that the drives are integrated into the individual handling installations or mounted on the handling installations. The drives of the handling installation thus additionally carry out the movements in the required directions. Each handling installation therefore including the gripper element can be actuated and/or moved in all directions.

An "open-loop control unit" is a unit for setting a parameter, according to which the varying dynamic variables occurring in a transport device are influenced. A control unit sets an output variable, in particular as a function of an input variable.

A "closed-loop control unit" is in particular a unit for influencing a variable in a transport device in a targeted manner, wherein this variable is to be either maintained as constant (fixed-variable control) or influenced in so that it in particular follows a predetermined temporal change (sequence control). The closed-loop control unit in particular measures the variable to be influenced (control variable) and continuously compares it with the desired value so that a feedback of the output variable onto the initial variable occurs.

In an embodiment of the transport device, the transport rail can, for example, comprise two handling installations and/or three handling installations and/or four handling installations and/or additional handling installations.

At least one handling installation can thus be assigned to each processing station so that a faster and more efficient transport of the work pieces along the processing station for increasing the degree of completion can occur. This allows for a higher cycle rate and/or a higher number of manufactured work pieces per time unit.

In order to allow for a secure gripping and/or holding of the work piece during transport and/or processing in the processing station, two handling units with respectively one gripper element are disposed opposite to each other around a work piece so that the work piece can be gripped securely by moving the two gripper elements toward each other.

In cases in which a single gripper element, for example, a magnetic installation, is no longer sufficient for gripping and/or holding, due to the weight and/or dimensions of the work piece, the arrangement of two or several handling installations with respectively one gripper element thus allows the maintaining of a secure grip on the work piece. The two gripper elements can be symmetrically disposed and approach the work piece on opposite sides and grip and/or hold the work piece, for example, by exerting pressure onto the work piece.

The work piece can thus be safely collected, clamped, held, moved, transported, displaced and/or set down.

A "gripper element" is in particular an element for gripping and/or holding and/or picking up and/or setting down a work piece. A gripper element can in particular be a gripper, a vacuum device, magnetic device and/or blowing device and/or gripper with or without a rotatory device, pincers and/or a gripper system.

In an embodiment of the transport device, two handling installations or several handling installations can, for example, be mechanically operatively connected so that the second handling installation or several handling installations assist the first handling installation when moving the load of the work piece.

In the event that a retaining and/or lifting force and/or acceleration of a single handling installations is not sufficient to move a work piece, several handling installations can thus be combined, coupled and/or docked at will to carry out the required function.

For example, if the gripper of a handling installation does not have the necessary force, for example, electromagnetic force, for holding the work piece, the movement of the two separately controllable, multi-dimensionally movable handling installations can occur, for example, so that they are clamped together or that the leading handling installation is braked. This makes it possible to generate the required forces, for example, for holding the work piece, by displacing the following multi-dimensionally movable handling installation more quickly, i.e., by accelerating it, while the leading handling installation continues its uniform movement. The two handling installations are thereby coupled with each other and, for example, mechanically, electronically, magnetically, or otherwise clamped together.

In an embodiment, the present invention provides a production installation, wherein the production installation comprises a transport device, in particular, such as described above.

A production installation with a flexible, space-saving, multi-dimensional transport device for transporting work pieces through consecutive processing stations can thus be implemented.

A core element of the present invention is that a production installation thus can be provided in which differing transfer/transport directions can be implemented. For the first time, more processing stations (for example, tools) can also be disposed in the same production installation. The production installation can also be better utilized, in particular when the production installation is a press.

In an embodiment of the production installation, the installation can, for example, comprise two station rows, wherein each station row comprises one transport device and several consecutive processing stations for manufacturing several work pieces, and the handling installation or the handling installations and/or the transport rail or the transport rails of the first station row and/or the handling installation or the handling installations and/or the transport rail or the transport rails of the second station row comprises a concurrent throughput direction or different throughput directions, in particular opposing throughput directions of the work pieces, so that the work pieces can be manufactured in one pass through the production installation without having to exchange the processing stations and/or change a tool.

As a result, the throughput direction for processing the tool and/or for manufacturing the product and/or increasing the degree of production, manufacture and/or completion in a production installation by the respective processing stations can be oriented not only in one direction but simultaneously in several different directions.

This allows for an increase of the output (number of manufactured products per time unit) without exchanging the processing stations during production and/or an increase of the number of processing stations in a production installation. Consequently, with the increase of the number of stages, which could previously be insufficient depending on the complexity of the products, additional processing stations, for example, forming processes, can be implemented. This is implemented by a uniaxial or multi-axial transport of different work pieces and/or products over at least two station rows so that the utilization level and the output of the production installation can be significantly increased.

The transport device can thus carry out a flexible transport of work pieces to subsequent processing stations within a production installation, wherein the work pieces can be transported between the consecutive processing stations of two station rows and/or flexibly moved in different directions.

The processing stations are either provided twice, thus requiring two respective identical station rows and achieving a doubled output, or two different sets of station rows (also possible with different numbers of processing stations per station row) for at least two different products are provided. When a total of twice the number of processing stations are arranged in the same direction, but to increase the state of production, manufacture and/or completion of only one product, it is necessary to transport the work pieces from one machine side (outlet of the first station row) to the other machine side (intake of the second station row). In doing so, the transport direction and/or movement can also be carried out on a curved, bent, for example, circular or elliptical track.

In contrast, an arrangement of station rows in opposite direction, in particular twice the number of processing stations, allows for an increase of the degree of production, manufacture and/or completion of only one product.

A "stations row" is more specifically a sequence of consecutive processing stations for manufacturing a product. A first stations row and a second stations row can in particular be disposed in parallel in two rows, wherein a space or no space is formed between the two station rows, depending on the transport device. The throughput direction through the two station rows and thus the movement of the respective carrier device can in particular be the same or opposed. The station rows can, however, in particular also be disposed in a row or transversely to each other.

The "throughput direction" is in particular the direction of transport of the work piece for increasing its degree of completion. The throughput direction in two station rows and/or consecutive processing stations, and/or a movement of the transport devices, in particular in the feed and/or transport direction of the transport rails and/or of the handling installations, are in particular the same or opposed.

In order to appropriately dispose the handling installation or the handling installations and/or the transport rails at the processing stations and/or the station rows, the handling installation or the handling installations and/or the transport rail or the transport rails are located inside and/or outside of the station rows and/or between the station rows.

This allows for a flexible arrangement of the transport device and/or the transport rails. The handling installation or the handling installations and/or the transport rail or the transport rails can therefore be disposed according to the space and movement requirements of the consecutive processing stations and/or station rows and, if applicable, moved out of the processing and/or tool area.

In an embodiment of the production installation, the production installation can, for example, comprise a synchronization installation so that work pieces can be synchronously or asynchronously controlled and/or moved and/or transported by the transport rails and/or the handling installations.

Whether the throughput direction is the same or not, the movements of the handling installations and/or the carrier rails are thus not necessarily synchronized. The handling installations can also move asynchronously relative to each other and/or on a transport rail and the movement of each individual handling installation can be programmed and/or controlled individually. Mutually opposite handling installations can also move synchronously or asynchronously.

The movements of the transport rails of a transport device and/or of the respective station rows and/or the respectively disposed handling installations including the gripper elements therefore only need to be synchronous in those directions, which all or only certain handling installations lack for transporting the work pieces or insofar as it is necessary for providing a collision-free operation. In contrast, the movements of the respectively associated transport rails do not have to be synchronous in the case of throughput directions having the same or different, for example, opposite, orientations.

A synchronous movement is also required when two opposite handling installations transport and/or grip a work piece together.

A "synchronization installation" is in particular a device for coordinating the temporal sequence of the movements of the transport device and/or of the transport rails and/or of the handling installations. A synchronization installation in particular allows for synchronous and/or asynchronous movements. A synchronization installation can in particular be an open-loop control and/or closed-loop control installation.

In order to flexibly manufacture products in a production installation, the station rows have identical processing stations and/or different processing stations so that identical work pieces or different work pieces can be manufactured in the station rows.

Two identical products can thus be manufactured simultaneously in two parallel station rows or an increase of the degree of production, manufacture, and/or completion can be carried out in two identical production rows. The quantity of one product is therefore doubled. In the process, the throughput direction can be oriented in both directions of the station rows in different or identical directions. Two different products can also be produced in two station rows arranged in parallel, or an increase of the degree of production, manufacture and/or completion can be carried out in two different processing stations.

The same quantity of two different products is thus produced simultaneously and in the same amount of time. In so doing, the throughput direction in both station rows can be flexibly oriented in different directions or in the same direction.

In an embodiment of the production installation, the production installation can, for example, comprise an additional transport device and/or at least one additional handling installation and/or at least one additional processing station at a beginning and/or an end of the station row and/or station rows, so that the work piece can be transferred between the station rows.

When the station rows have oppositely oriented throughput directions, a transfer from one stations row to the other stations row can thus be carried out inside a production installation, insofar as it cannot be directly performed by a handling installation. To this end, an additional device, for example, a transport, alignment and transfer station, can be required in the stations row. The transport direction and/or movement therefor can also be carried out on a curved, bent, for example, circular or elliptical track.

In order to transfer a work piece between two station rows, the additional transport device and/or the at least one additional handling installation and/or the at least one additional processing station can be disposed in any location of the production installation. This additional transport device, for example, also a robot, magnetic track, conveyor belt, is not required in cases in which the carrier rail with the handling installation or individual controllable handling installations with or without a carrier rail are located on an appropriate, for example, one or several sides of the stations row between or at the carrier rails or between the two arrangements of the station rows and can move on a suitable track for example on a curved or bent rail. This track is therefore designed so that in one location, for example, the narrowest location of the transport rail, a smooth transition from one track to the other is formed, which can be crossed by the handling installations for transporting and/or transferring the work pieces.

In an embodiment, the present invention provides a forming press with several processing stations, in particular a transfer press, wherein the forming press comprises two station rows or is a previously described production installation, and in particular comprises a previously described transport device, so that a number of completed work pieces per time unit can be flexibly increased by the multi-axial transport of the work piece along consecutive processing stations of the two stations row.

A press with a flexible uniaxial or multi-axial transport device can thus be provided, which features short transport paths and thus allows for energy savings as well as an increase of the cycle rate and lesser weight and space requirements.

This is particularly advantageous when different work pieces are processed simultaneously with each slide stroke in the processing stations of a press, since this leaves very little time and space for transporting the work pieces and requires a complex coordination of the individual movements, without disturbing the processing in the tool area.

Instead of carrying out the manufacture in two multi-station presses with six respective tools and a transfer device between both multi-station presses, the manufacture can thus be carried out simultaneously inside one single transfer press with two parallel rows with six respective tools/processing stations. It is in particular advantageous that the throughput direction of the work piece along the processing stations can be freely selected and/or modified based on a redundancy of the processing stations during manufacturing.

The customarily externally located blanking slide for the integrated production of blanks can also be dispensed with, and the blanking tool can be directly integrated into the transfer press.

It is particularly advantageous that due to the arrangement of the point of traction in a press, for example, with two decentralized torque motors in the press table, an identically or oppositely oriented throughput direction of the work pieces can be implemented by the transport device while still providing for an acceptable tilt of the slide.

A "forming press" is more specifically a forming machine with a linear relative movement of the tools. A number of manufacturing methods, such as master forming, forming, deep drawing, joining, coating, separating, cutting and/or modifying material properties, can be carried out in presses. A press is in particular a path-bound, energy-bound or force-bound press.

A "transfer press" is more specifically a press in which the machining operations required for manufacturing a work piece are combined and carried out almost simultaneously. In a transfer press, one work piece is in particular manufactured with each slide stroke.

In an embodiment, the present invention provides a method for manufacturing products from work pieces by a production installation with at least two station rows, wherein identical work pieces or different work pieces are manufactured in both station rows, and the production installation comprises a previously described transport device, and/or by a previously described production installation and/or by a forming press, wherein the work pieces are uni-axially or multi-axially transported to the respectively subsequent processing station by the transport device, wherein the work piece is transported in both station rows in the same throughput direction or in opposite throughput directions, so that the work pieces are manufactured in one pass in the production installation, without having to exchange the processing stations and/or change a tool.

A more flexible, space-saving and cost-effective method for manufacturing products from work pieces in a production installation is thus provided. Since shorter transport paths are implemented, the number of manufactured products per time unit and the utilization can be increased.

The present invention is described in more detail below based on exemplary embodiments.

A transport gripper 101 without a drive is disposed on a transport rail 120 and comprises a device support holder 45.

In one alternative, a transport gripper 102 is disposed at a transport rail 120 and comprises two parallel externally disposed drives 10, 11, 16 and 17. The drives 10, 11, 16 and 17 are disposed at the transport rail 120. The drives 10, 11, 16 and 17 are connected to the device support holder 45 by way of the catch 43 and the connection plate 44. Guides 14 and 15 are disposed at the transport gripper 102 in order to serve as reinforcing elements under the load of a work piece.

In one alternative, the transport gripper 103 comprises an internally disposed drive 10, 11, 16, 17, which is located on the side of the center of the machine 115.

In one alternative, the transport gripper 104 comprises a drive disposed at the top.

In one alternative, the transport gripper 105 comprises an externally disposed drive 17 (in a top view). In addition, the transport gripper 105 comprises a device support holder 45, a gripper arm 33 and a gripper jaw 36. The guides 14 and 15 are provided as reinforcing elements.

In one alternative, the transport gripper 106 comprises two externally disposed drives 17 and 19 in a row (in a top view). The transport gripper 106 otherwise has the same construction as the transport gripper 105.

In one alternative, the transport gripper 107 comprises an internally disposed drive 17 (in a top view) on the side of the center of the machine 115. The transport gripper 107 also comprises guides 14 and 15 as reinforcing elements.

In one alternative, the transport gripper 108 comprises two internally disposed drives 17 in a row (in a top view) as well as guides 14 and 15.

In one alternative, the transport gripper 109 comprises one internally and one centrally disposed drive 16, 17, wherein the centrally disposed drive is located along the longitudinal axis of the center of the machine 115.

In one alternative, the transport gripper 110 comprises an internally disposed drive 16, 17, which is longitudinally flush with the end of the device support holder 45 and the catch 43.

In one alternative, the transport gripper 111 comprises a linear guide 133 (without a gripper arm 33 in a lateral view and with a gripper arm 33 in a top view).

In one alternative, the transport gripper 112 comprises a linear guide 133 having a compact design.

Figure 19:
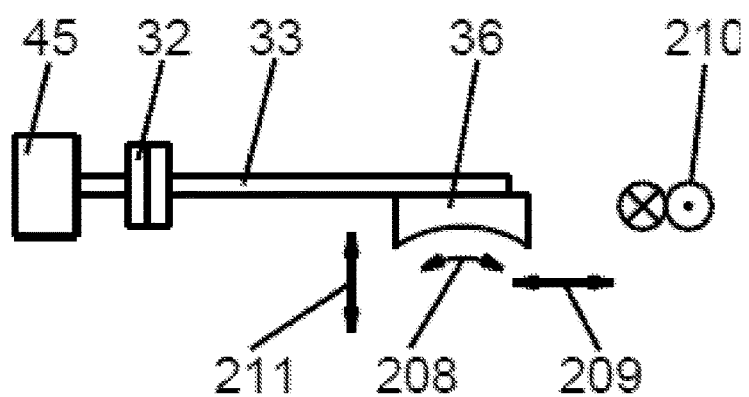
FIG. 19 shows an alternative of an active transport gripper in a top view which comprises a gripper arm on which the gripper jaw is permanently mounted.

An active transport gripper (FIG. 19 in a top view) comprises a gripper arm 33, on which the gripper jaw 36 is permanently mounted. The gripper jaw 36 is only mechanically adjustable in the directions 208, 209, 210 and 211.

Figure 14:
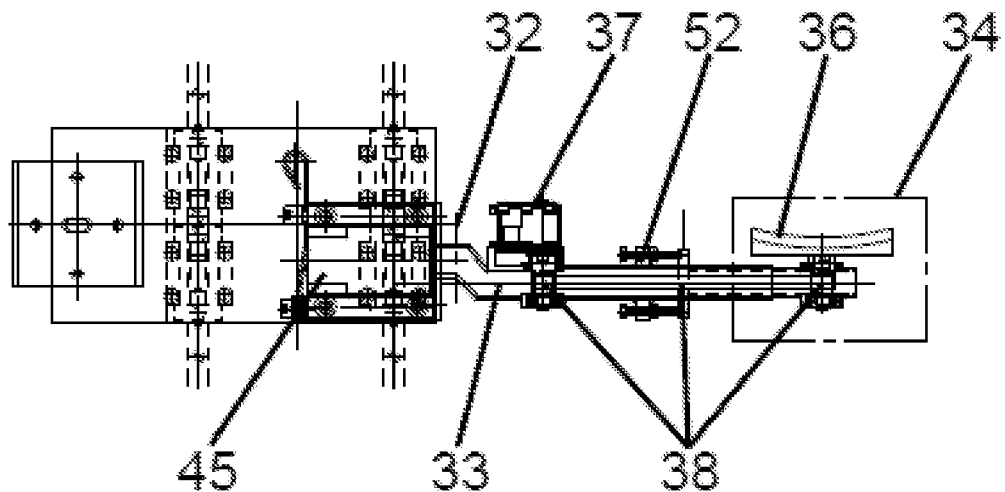
FIG. 14 shows an alternative of an active transport gripper in a top view where the gripper arm is fastened to a rotation mechanism of the transport gripper.

In one alternative of the active transport gripper (FIG. 14 in a top view), the gripper arm 33 is fastened to a rotation mechanism 32 of the transport gripper. In addition, a rotation mechanism 37 is disposed on the gripper arm 33. Furthermore, the gripper arm 33 comprises a drive train 38 and a gripper jaw 36. Furthermore, an adjusting device 52 is disposed on the gripper arm 33.

Figure 15:
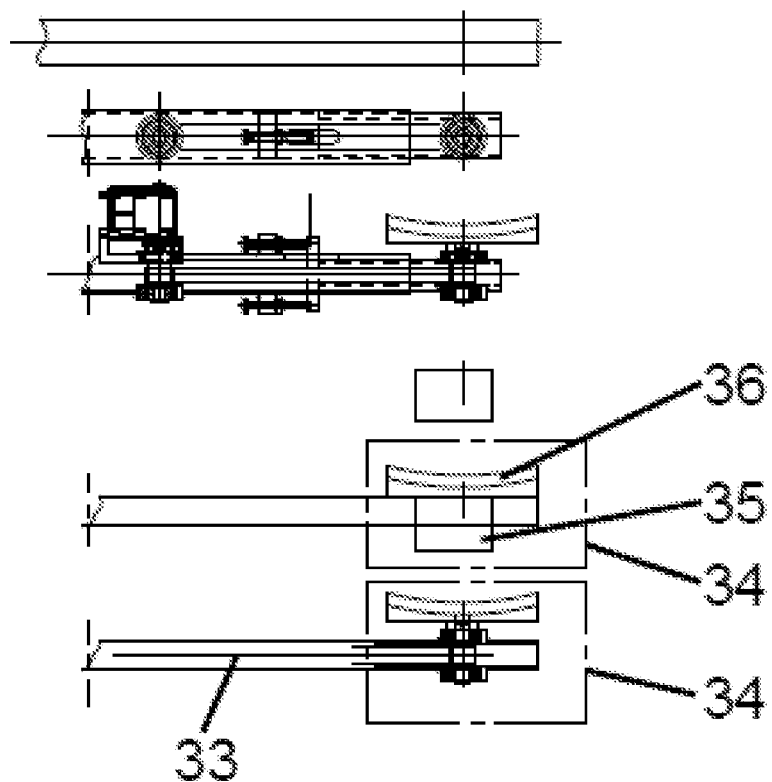
FIG. 15 shows an alternative of an active transport gripper where a turning mechanism is disposed directly in the area of the gripper jaw so that the gripper jaw is directly driven and an active gripper element is implemented.

In one alternative, another turning mechanism 35 is disposed directly in the area of the gripper jaw 36 (FIG. 15), so that the gripper jaw 36 is directly driven and an active gripper element 34 is implemented.

Figure 16:
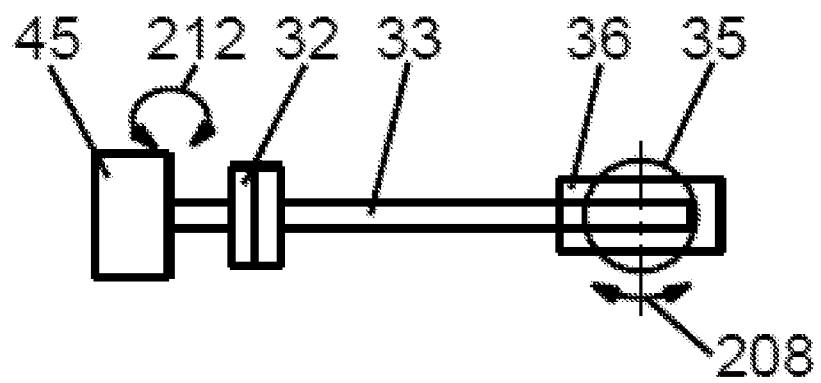
FIG. 16 shows an alternative of an active transport gripper where a rotation mechanism is disposed on the gripper arm in proximity to the device support holder so that a pivoting movement of the transport gripper can be implemented.

In one alternative (FIG. 16), an additional rotation mechanism 32 is disposed on the gripper arm 33 in proximity to the device support holder 45, so that a pivoting movement 212 of the transport gripper can be implemented.

Figure 17:
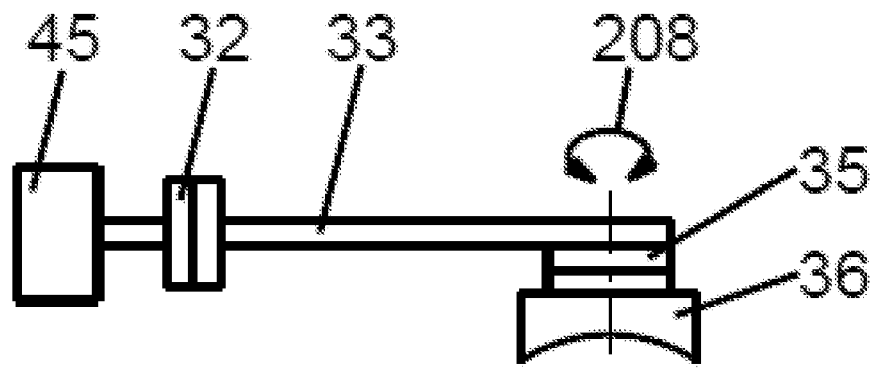
FIG. 17 shows an alternative of an active transport gripper where the rotation mechanism is directly mounted between the gripper jaw and the gripper arm to allow a directly driven rotational movement of the gripper jaw and a work piece disposed on it at any angle.

In one alternative, the rotation mechanism 35 is directly mounted between the gripper jaw 36 and the gripper arm 33 (FIG. 17). This allows for a directly driven rotational movement 208 of the gripper jaw 36 and a work piece disposed on it, at any angle.

Figure 18:
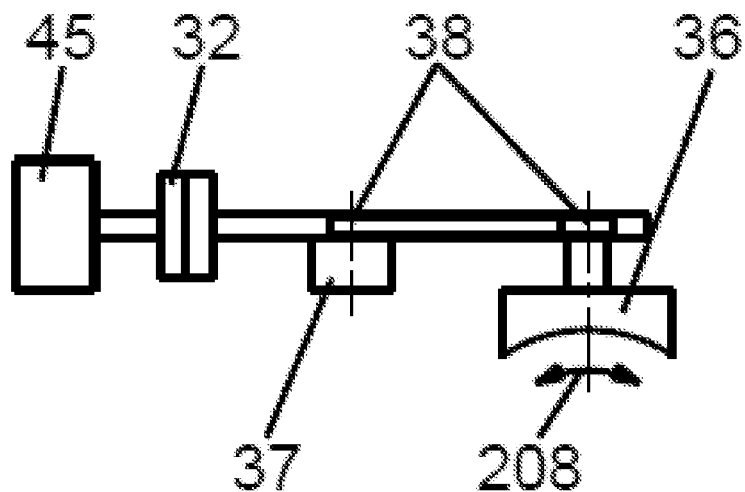
FIG. 18 shows an alternative of an active transport gripper where the rotation mechanism is replaced by a rotation mechanism disposed at a distance from the work piece.

In one alternative, due to a lack of space, the rotation mechanism 35 is replaced by a rotation mechanism 37 disposed at a distance from the work piece (FIG. 18 in a top view). The rotation device 37 is disposed at the gripper arm 33 at a distance from the gripper jaw 36. The transmission of the rotational movement is carried out by a drive train 38, which is disposed between the rotation mechanism 37 and the axis of the gripper jaw 36.

Figure 20:
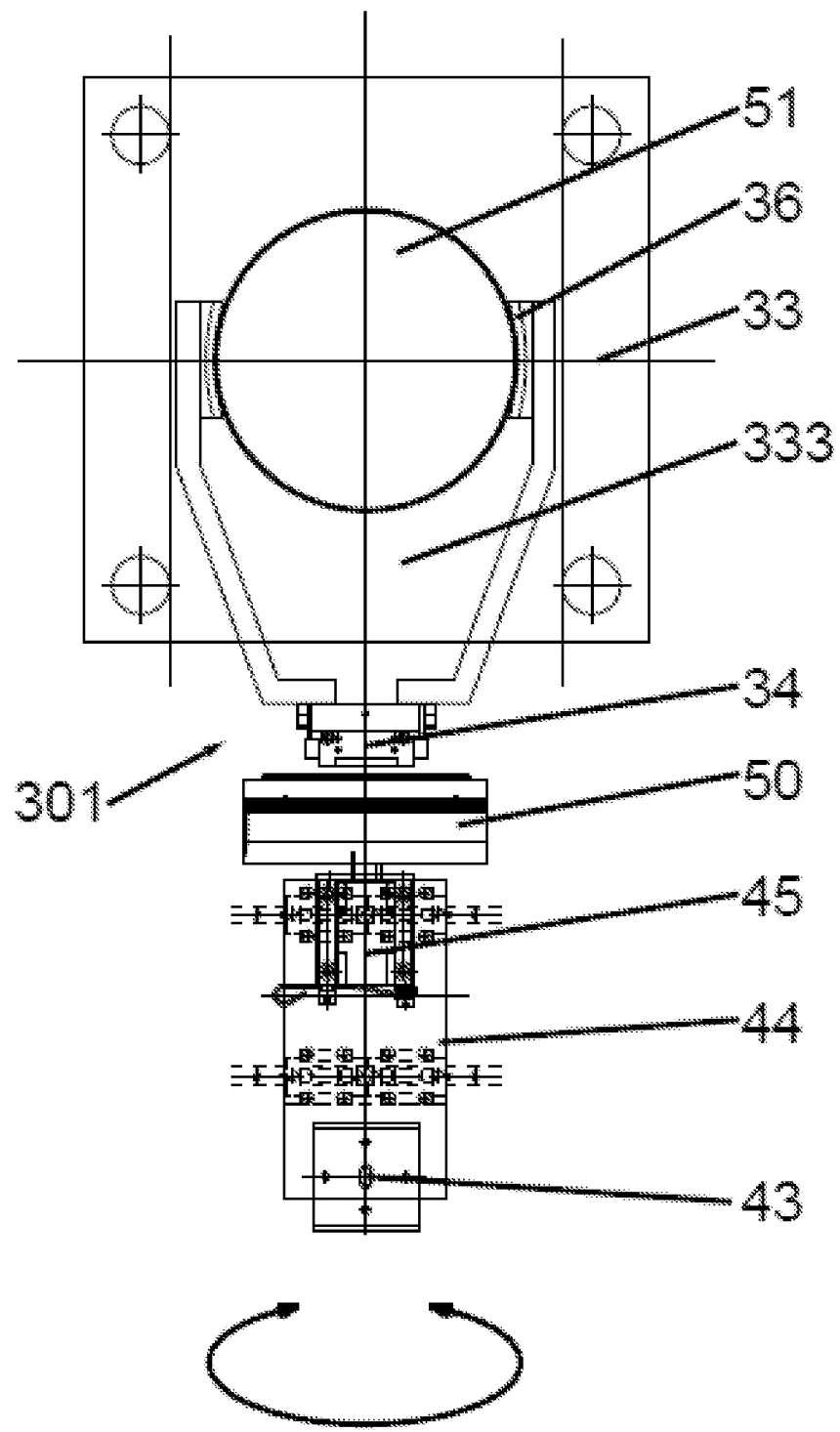
FIG. 20 shows a transport gripper with a pivoting unit and commercially available 2-finger parallel gripper units.
Figure 21:
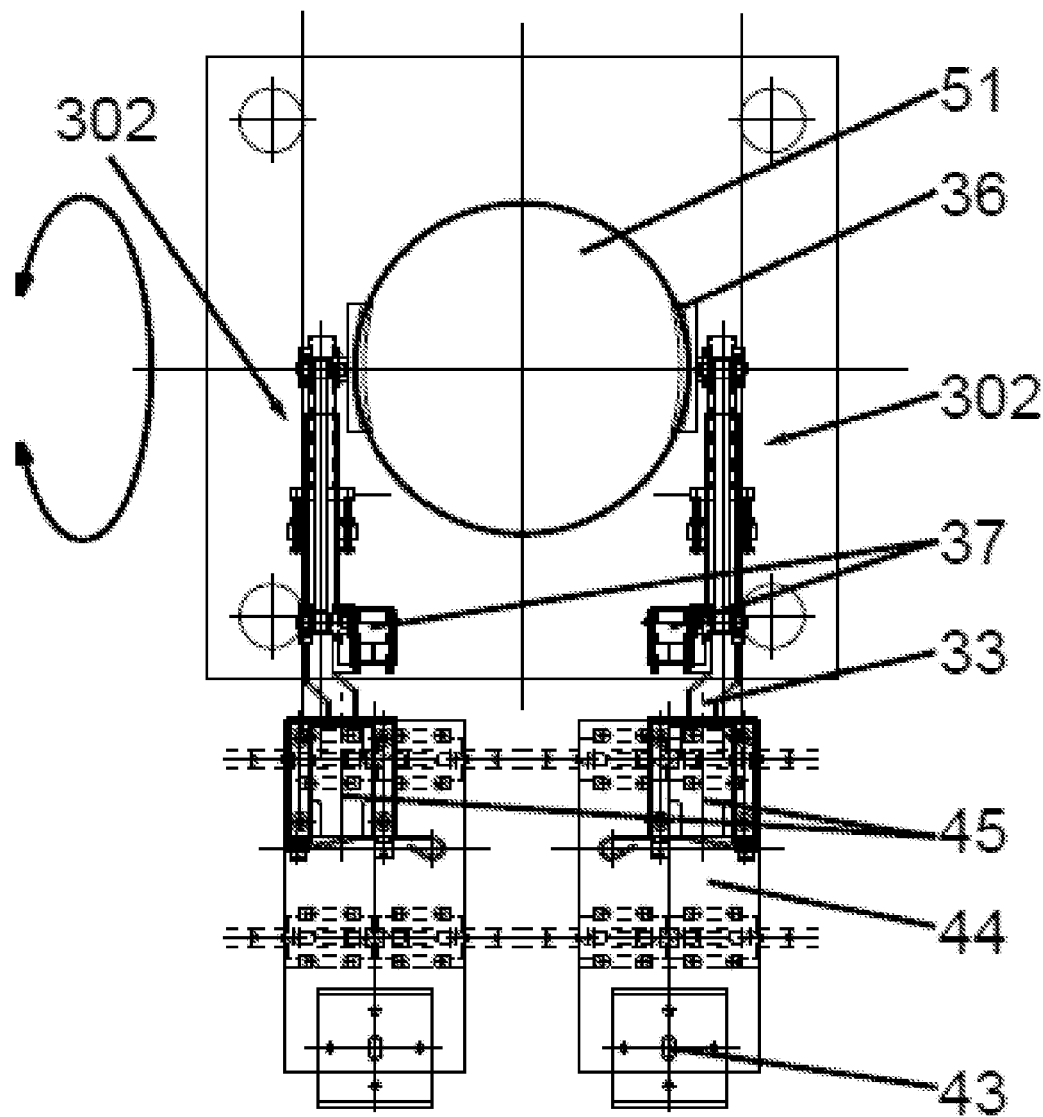
FIG. 21 shows two active transport grippers with a rotatory drive.

In a transport gripper 301 a commercially available 2-finger parallel gripper unit 333 is used (FIG. 20 in a tope view). The transport gripper 301 comprises a catch 34, a connection plate 44 and a device support holder 45. A pivoting unit 50 is disposed at the device support holder 45. The 2-finger parallel gripper unit 333, which comprises two gripper arms 33 with respectively one gripper jaw 36, is disposed at the pivoting unit 50. A work piece 51 is held between the gripper jaws 36. The 2-finger parallel gripper unit 333 and thus the work piece 51 are pivotable by way of the pivoting unit 50.

In an alternative according to the present invention, a transport gripper 302 comprises a catch 43, a connection plate 44 and a device support holder 45 (FIG. 31 in a top view). The gripper arm 33, which comprises a rotation mechanism 37, is disposed on the device support holder 45. The rotation mechanism 37 is connected to the gripper jaws 36 by way of a drive train. Two transport grippers 302 are symmetrically disposed so that the opposite gripper jaws 36 hold the work piece 51. The gripper jaws 36 and thus the work piece 51 are rotatable by way of the rotation mechanism 37 and the associated drive train.

Figure 22:
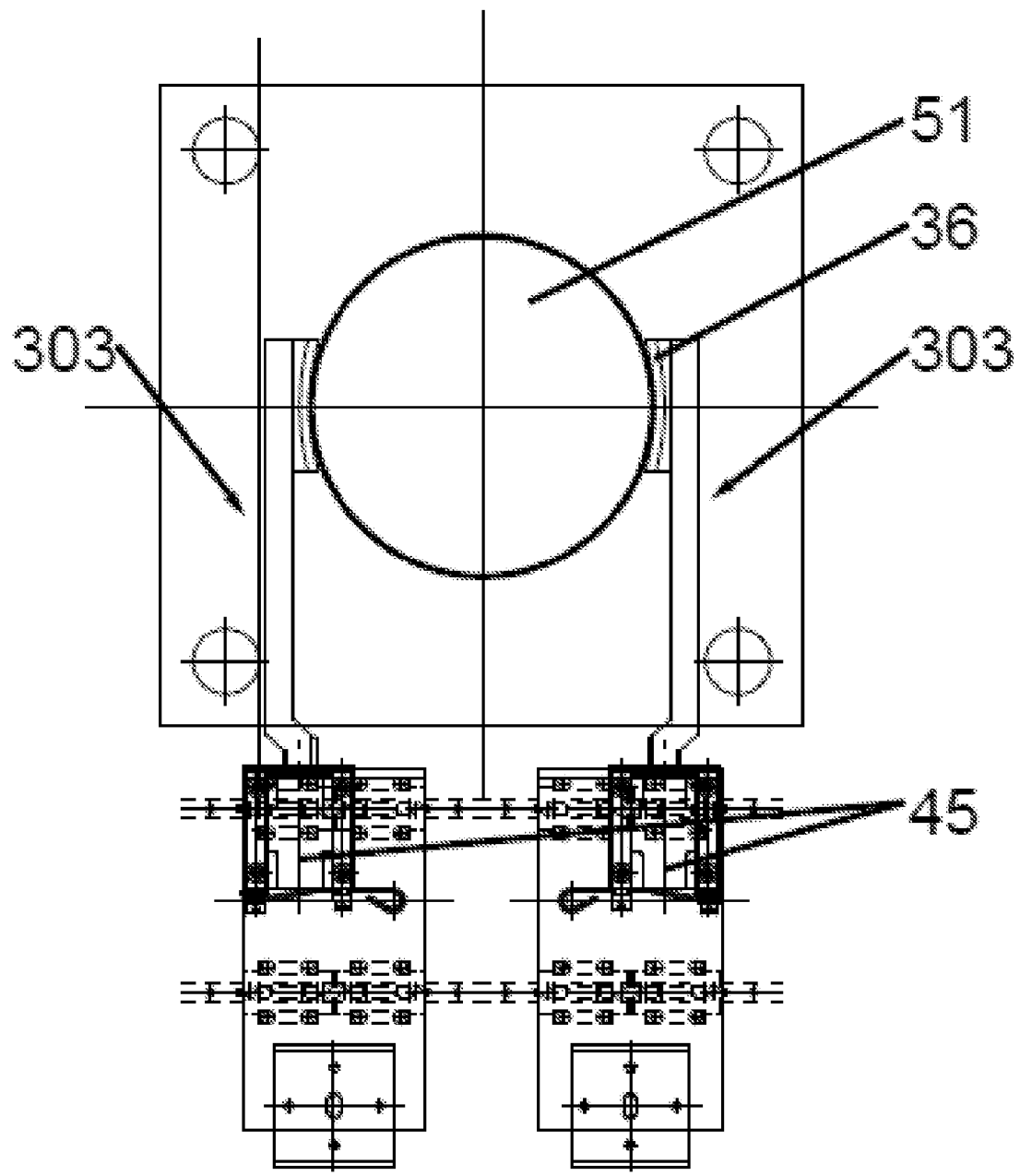
FIG. 22 shows two passive transport grippers without a rotatory drive.
Figure 23:
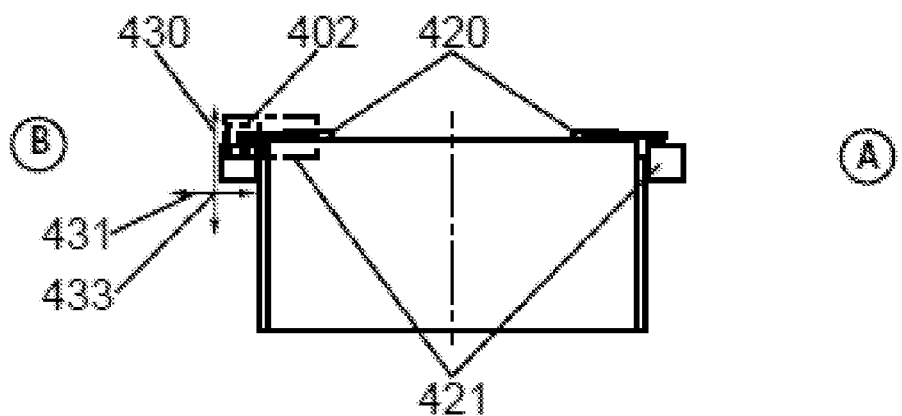
FIG. 23 shows a cross-section through a transfer press with two rows of stations and externally located transport rails.

In an alternative according to the present invention, the transport gripper 303 does not comprise a rotation mechanism 37 and associated drive train (FIG. 22 in a top view) so that a passive handling installation is provided.

A comparison of the transport gripper 301 using the commercially available 2-finger parallel gripper unit 333 with the active transport gripper 302 according to the present invention and the passive transport gripper 303 according to the present invention shows that the distance between the center of the work piece 51 and the center of the catch 43 is shorter in the active and passive transport grippers 302 and 303 according to the present invention than in the transport gripper 301 using the commercially available 2-finger parallel gripper unit 333. A shorter transport path and lesser space requirements are thus provided.

A transfer press 400 comprises a first station row 416 and a second station row 418. A first transport rail 422 is disposed on the outside of the first station row 416 and a second transport rail 423 is disposed outside of the second station row 418. The station rows 416 and 418 are connected by way of a third transport rail 424. The two station rows 416 and 418 comprise respectively ten processing stations 420. Two transport grippers 402 for each processing station 420 are respectively disposed at the first transport rail 422 and the second transport rail 423.

Figure 25:
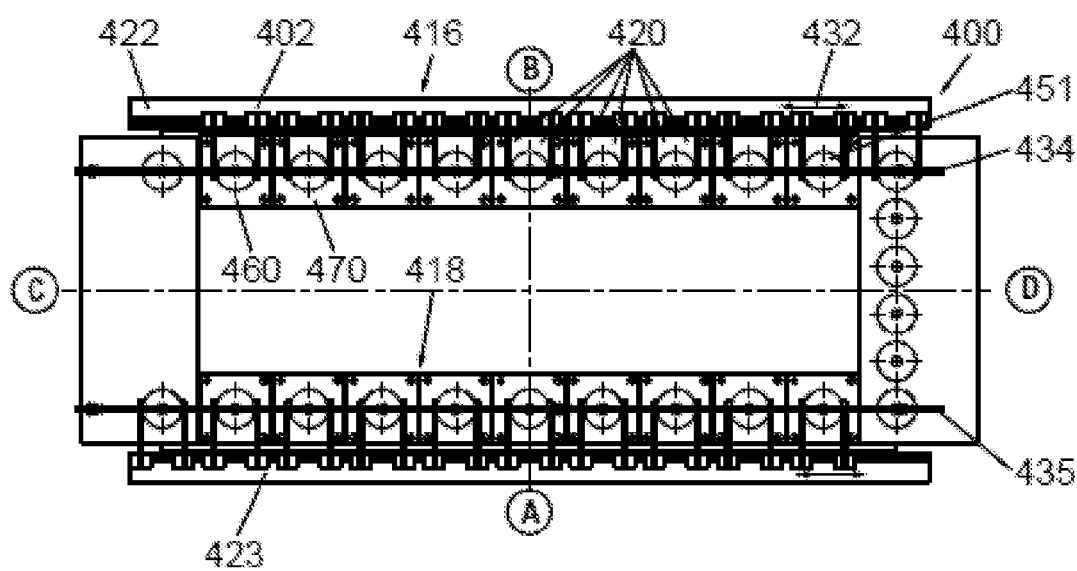
FIG. 25 shows a top view of a transfer press with two rows of stations, externally located transport rails, and identical throughput directions.

The first transport rail 422 and the second transport rail 423 can be moved independently from each other. The transport direction of the first transport rail 434 and the transport direction of the second transport rail 435 as well as the sequence of consecutive processing stations 420 are identical. Thus the throughput direction of the work pieces 451 processed in each processing station 420 is the same in the first station row 416 and in the second station row 418 (FIG. 25). Compared to a conventional transfer press, the same products are produced in the station rows 416 and 418 but with double the number.

Figure 24:
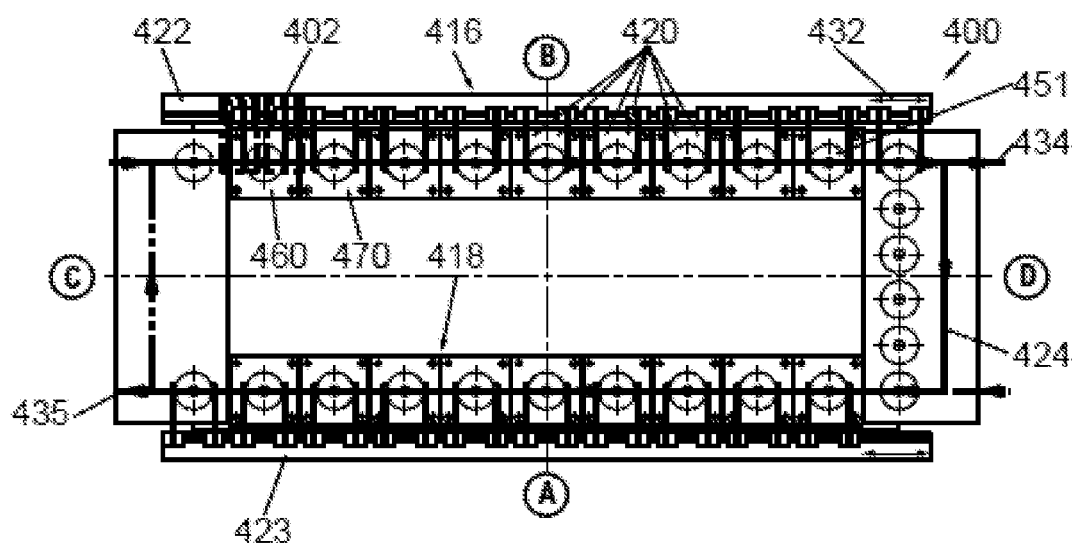
FIG. 24 shows a top view of a transfer press with two rows of stations, externally located transport rails, and opposite throughput directions.

In one alternative, the transport direction of the first transport rail 434 is opposite to the transport direction of the second transport rail 435, so that the throughput directions of the work pieces are opposed (FIG. 24). After the last processing station 420 of the first station row 416, the work piece is transported by way of the third transport rail 424 to the second station row 418. The station rows 416 and 418 comprise different processing stations 420, so that a product is entirely manufactured inside the one transfer press 400 without exchanging a tool or a processing station.

The transfer press 400 allows implementing the following work processes.

In the transfer press 400, a metal sheet is supplied to the first processing station 460 of the first station row 416 and collected by the two transport grippers 420 of this processing station 460 and transported into the processing area. The transfer press 400 executes a slide stroke. This way, a circle is blanked out of the metal sheet in the first processing station 460 and a previously blanked metal sheet is bent in the second processing station 470, which follows the first processing station 460 in the transport direction 434 of the first transport rail 422. After processing, the blanked metal sheet and the bent metal sheet are simultaneously moved out of the first processing station 460 and the second processing station 470 by the associated transport grippers 420 and set down. By moving the first transport rail 416, the blanked metal sheet is then brought to the processing station 470 and the bent metal sheet is brought to the subsequent processing station 420 in the transport direction 434 of the first transport rail 422. The metal sheets are there collected by the associated transport grippers 420 of the respective processing station 470, 420 and transported into the respective processing area. In accordance with the transport and processing in the first processing station 460 and the second processing station 470, a simultaneous processing of each work piece 451 in each of the processing stations 420 of the first station row 416 and of the second station row 418 correspondingly takes place with each slide stroke of the transfer press 400.

All the processed work pieces 451 are then transported to the next processing station 420 and the completed work piece is output by the last processing station in the throughput direction.

The present invention is not limited to embodiments described herein; reference should be had to the appended claims.

LIST OF REFERENCE NUMERALS

10 Drive (Bottom part)
11 Drive (Top part)
14 Guide (Top part)
15 Guide (Bottom part)
16 Drive (removable part)
17 Drive (fixed part)
32 Rotation mechanism
33 Gripper arm
34 Active gripper element
35 Turning mechanism
36 Gripper jaw
37 Rotation mechanism
38 Drive train
43 Catch
44 Connection plate
45 Device support holder
50 Pivoting unit
51 Work piece
52 Adjusting device
101 Transport gripper without drive
102 Transport gripper with two parallel externally disposed drives
103 Transport gripper with one internally disposed drive
104 Transport gripper with one drive disposed at the top
105 Transport gripper with one externally disposed drive
106 Transport gripper with two externally disposed drives
107 Transport gripper with one internally disposed drive
108 Transport gripper with two internally disposed drives
109 Transport gripper with one internally and one centrally disposed drive
110 Transport gripper with one internally disposed drive flush with the catch and the device support holder
111 Transport gripper with a linear guide
112 Transport gripper with a linear guide (compact design)
115 Machine center
120 Transport rail
133 Linear guide
134 Passive gripper element
208 Rotation mechanism
209 X-Direction of movement
210 Z-Direction of movement
211 Y-Direction of movement
212 Pivoting movement
301 Transport gripper with commercially available 2-finger parallel gripper unit
302 Active transport gripper with rotatory drive
303 Passive transport gripper without rotatory drive
333 2-finger parallel gripper unit
400 Transfer press
402 Transport gripper
416 First station row
418 Second station row
420 Processing station
421 Transport rails
422 First transport rail
423 Second transport rail
424 Third transport rail
430 Transport direction in the direction of the Z-axis
431 Transport direction in the direction of the Y-axis
432 Transport direction in the direction of the X-axis
433 Transport direction of the transport rail
434 Transport direction of the first transport rail
435 Transport direction of the second transport rail
451 Work piece
460 First processing station
470 Second processing station

The invention claimed is:

1. A forming press comprising:
a first station row and a second station row each of which comprises, a plurality of consecutively arranged processing stations which are configured to manufacture at least one work piece, and a first transport device which is configured to transport the work pieces along the plurality of consecutively arranged processing stations, wherein, each first transport device comprises, at least one of a first handling installation which is configured to transport the at least one work piece, and a first transport rail which is configured to be at least one of longitudinally displaceable, vertically displaceable, and transversely displaceable, and a drive configured to drive at least one of the first handling installation and the first transport rail, the first handling installation is configured to be multi-dimensionally displaceable so that a multi-axis transport of the at least one work piece is flexibly realized by the first handling installation alone, and the first handling installation of the first station row and the first handling installation of the second station row comprise an opposite throughput direction with respect to each other so that the at least one work piece can be manufactured in one pass through the forming press without having to at least one of exchange one of the plurality of consecutively arranged processing stations and change a tool.

2. The forming press as recited in claim 1, further comprising:

at least one second transport rail, wherein, the first transport rail and the at least one second transport rail are arranged so as to be displaceable independently of each other.

3. The forming press as recited in claim 2, wherein the first transport device further comprises at least one second handling installation.

4. The forming press as recited in claim 3, wherein each of the first handling installation and the at least one second handling installation comprises a gripper element, the gripper elements being arranged opposite to each other around the at least one work piece so that the at least one work piece is gripped by moving the gripper elements towards each other.

5. The forming press device as recited in claim 3, wherein the first handling installation and the at least one second handling installation are mechanically operatively connected so that the at least one second handling installation assists the first handling installation when moving the load of the at least one work piece.

6. The forming press as recited in claim 3, wherein, at least one of, the first handling installation or the at least one second handling installation and, the first transport rail or the at least one second transport rail, are arranged inside or outside of the first station row and the second station row or between the first station row and the second station row.

7. A method for manufacturing products from work pieces via the forming press as recited in claim 3 where the first station row and the second station row manufacture work pieces which are identical or different, the method comprising:

uniaxially or multi-axially transporting work pieces to a respective subsequent processing station via the first transport device, wherein, at least one of the first handling installation and the at least one second handling installation is configured to be multi-dimensionally displaceable so that a multi-axis transport of the work pieces is flexibly realized by the first handling installation alone in the station row, and the work pieces are transported in each of the first station row and the second station row in an opposite throughput direction so that the work pieces are manufactured in one pass in the forming press without having to at least one of exchange one of the plurality of consecutively arranged processing stations and change a tool.

8. The forming press as recited in claim 1, further comprising:

at least one of an open-loop control unit and a closed-loop control unit, wherein, the at least one of an open-loop control unit and a closed-loop control unit is assigned to the first handling installation of each of the first station row and the second station row so that a movement axis is at least one of individually controllable and individually adjustable.

9. The forming press as recited in claim 1, wherein the first handling installation of each of the first station row and the second station row is arranged at the first transport rail or at one of the plurality of consecutively arranged processing stations.

10. The forming press as recited in claim 1, further comprising:

a synchronization installation which is configured so that the at least one work piece can be at least one of, synchronously or asynchronously controlled, moved, and transported, by at least one of, the first transport rail and the at least one second transport rail, and the first handling installation and the at least one second handling installation.

11. The forming press as recited in claim 1, further comprising, at a beginning or at an end of at least one of the first station row and the second station row, at least one of:

a second transport device;

at least one second handling installation; and at least one additional processing station, so that the work piece can be transferred between the first station row and the second station row.

* * * * *